US010380839B2

(12) United States Patent
Lyons et al.

(10) Patent No.: US 10,380,839 B2
(45) **Date of Patent: *Aug. 13, 2019**

(54) MOBILE CONTROL FOR ELECTRONIC GAMING MACHINE AND TABLES

(71) Applicant: Bally Gaming, Inc., Las Vegas, NV (US)

(72) Inventors: Martin S. Lyons, Henderson, NV (US); Bryan M. Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,617

(22) Filed: Aug. 10, 2018

(65) Prior Publication Data

US 2018/0350186 A1 Dec. 6, 2018

Related U.S. Application Data

(63) Continuation of application No. 15/658,232, filed on Jul. 24, 2017, now Pat. No. 10,140,811, which is a continuation of application No. 14/274,582, filed on May 9, 2014, now Pat. No. 9,734,661.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |

(52) U.S. Cl.

CPC ........ *G07F 17/323* (2013.01); *G07F 17/3227* (2013.01); *G07F 17/3239* (2013.01); *G07F 17/3244* (2013.01); *G07F 17/3288* (2013.01)

(58) Field of Classification Search

CPC ............. G07F 17/3202; G07F 17/3204; G07F 17/3209; G07F 17/3218; G07F 17/322; G07F 17/323

See application file for complete search history.

(56) References Cited

U.S. PATENT DOCUMENTS

| | | | | |
|---|---|---|---|---|
| 2003/0064805 A1* | 4/2003 | Wells | G07F 17/32 | 463/39 |
| 2003/0232640 A1* | 12/2003 | Walker | G07F 17/32 | 463/16 |
| 2004/0053661 A1* | 3/2004 | Jones | G07F 17/32 | 463/16 |
| 2008/0176637 A1* | 7/2008 | Letovsky | G07F 17/32 | 463/20 |

* cited by examiner

*Primary Examiner* — Milap Shah
*Assistant Examiner* — Jason Pinheiro
(74) *Attorney, Agent, or Firm* — Marvin A. Hein

(57) ABSTRACT

Disclosed is a system and method for enhanced mobile control of electronic gaming machines and tables. In one aspect, statistical information is provided to a player in convenient and useful formats. Also disclosed are approaches to providing convenient transactions that a player can employ to fund game play.

10 Claims, 18 Drawing Sheets

MOBILE CONTROL FOR ELECTRONIC GAMING MACHINE AND TABLES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure is directed to wagering games, gaming machines, networked gaming systems and methods, and in particular to enhanced mobile control for electronic gaming machines and tables.

BACKGROUND

In the past, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device. There is also the desire to incorporate mobile devices for game play, however, there are numerous obstacles to the use of mobile devices for game play, including the lack of ticket printers and bill acceptors.

Historically, there has been "Ticket-in-Ticket-Out" functionality in gaming machines. Briefly explained, when using "Ticket-in-Ticket-Out" functionality a player inserts cash into a gaming machine, but does not receive cash when pressing "cash out." Instead, he or she receives a paper ticket that may be further inserted into the present or any other gaming machine, or redeemed for cash by inserting into a kiosk.

It may desirable to replace "Ticket-in-Ticket-Out" functionality with a mobile telephone application operated by a player on their own personal mobile phone. The player could install such an application on their phone by receiving and activating a link to a URL supplied by a casino. The link can take the form of a printed QR code or can be contained in email promotions.

While there is a desire to use mobile devices such as smart phones as gaming devices, there remains a need for additional functionality that can be delivered when a gaming system is in operation. In particular, certain manufacturers have implemented systems in the past for displaying statistics to players for entertainment purposes. One of the very earliest of these statistics would be displaying the number of games since a royal flush was hit on a particular EGM—such a statistic was displayed on Olympic Poker machines in 1993 in Australia.

One problem with these statistics has been that they have usually had to be buried within help screens or otherwise remained hidden to most players, so as not to overwhelm the gaming experience. Another problem is that any detailed statistics would preferably need to be reviewed at leisure by a player. Presenting this information on an EGM prevents play while a player is reviewing the information.

Yet another problem with existing statistic solutions has been presenting relevant information to a player. While giving the results of the last 100 spins at a particular EGM may be presented as a graph or bar chart, it is difficult to do this in a way that helps players see patterns. In particular, the experience of other players at a particular EGM may not fit with the current player's betting strategy or results, and therefore does not feel relevant to a player.

A final problem is that players may not like casinos collecting data on their play. Displaying information about their play on the EGM may make a player uncomfortable.

It is thus desirable to have mobile devices including enhanced mobile control for electronic gaming machines and tables. In one aspect, there is a need for conveniently displaying statistical and other information. Accordingly, there exists a need in the art to address these and other issues.

SUMMARY

Briefly, and in general terms, a method and system is disclosed for providing a set of easy to understand and operator transactions that a player can employ to conduct game play through a personal mobile telephone. Statistical information can be provided to the player in convenient and useful formats to enhance the use of the mobile phone for gaming purposes.

This disclosure further provides an approach to using existing smart phones where there is no requirement for near field or any extra hardware. The disclosed approach uses existing casino systems infrastructure and does not require any additional peripherals, and involves an easy to understand set of transactions for players. Ongoing play is available through further credits being added by the player easily and can replace TITO infrastructure, or can be used in parallel with TITO. There is additionally player acceptance of security models where financial transactions can take place on their phone, and not the EGM. Integration with a wide range of funding is possible. Moreover, jurisdictional requirements are met in that funding need not take place at an EGM, and multiple authentication methods are supported. Thus, moving between EGMs and cashing out is convenient for the player. Rules for auto-funding (when available) and loss limit possible for harm minimization, and rules for moving excess funds from a successful session back to wallet are also provided. In one particular embodiment, existing player tracking interface infrastructure such as iView or iView DM, existing slot machines, Bally CMS such as SDS, and Smartphone with data connection are contemplated to be used.

Moreover, this disclosure provides a method and system for delivering data on a player-owned mobile device. Data may be easily personalized and adapted to player behavior. In addition, the player may customize the behavior of the operation of the game by customizing their mobile device operation.

In one preferred implementation, this disclosure leverages E-Wallet infrastructure such as a mobile wallet for casinos. In particular, systems and methods of associating a mobile device with a particular gaming machine are provided. These systems and methods are configured to be very easy for a player to operate with no training.

Accordingly, the present system and method uses E-wallet infrastructure to provide easy association with mobile device and EGM and provides extra reasons for players to use E-Wallet. There is very low additional cost as a player uses owned devices. It is expected that player acceptance will be higher because of the interface being presented on a private device. Moreover, the distinct approach allows modification of existing games via extra features on mobile device without any additional approval. Further, the system and method can operate outside of player tracking infrastructure if required. Significantly, statistics can be presented to player from existing games without re-approval, and players can peruse statistics off-line at their leisure. Also, the system enables player customization of games (such as bet patterns) without complicating game interface. Thus, personalized statistics, modification of bet interface at the mobile device (for example hot and cold buttons), setting betting strategy which can persist across sessions can be retrofitted to existing games and are available to the user.

Features and advantages will become apparent from the following detailed description, taken in conjunction with the accompanying drawings, which illustrate by way of example, the features of the various embodiments.

DETAILED DESCRIPTION OF PREFERRED EMBODIMENTS

Figure 1:
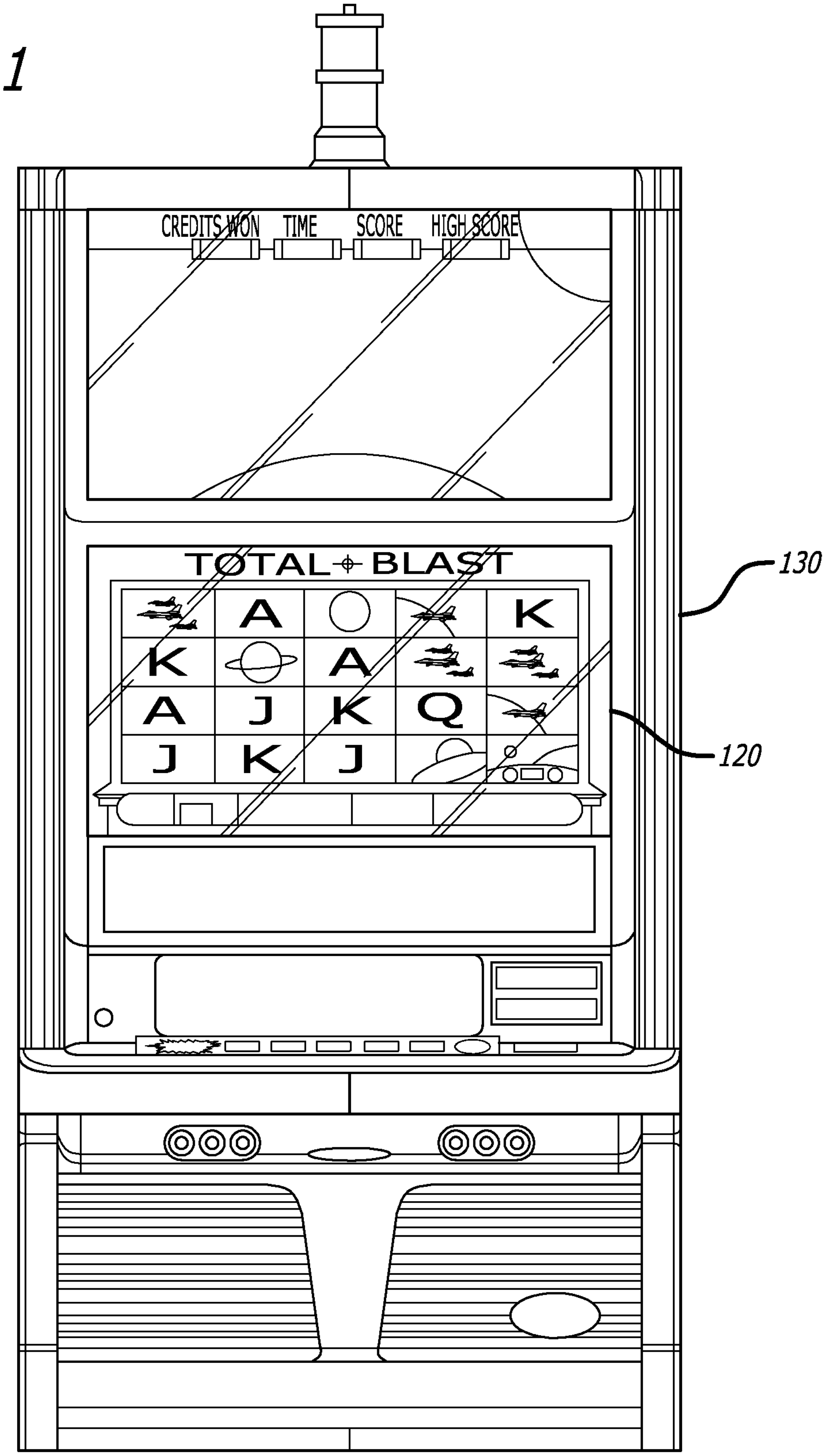
FIG. 1 illustrates an Alpha cabinet running the game "Total Blast."

Various embodiments are directed to a game, gaming machine, gaming systems and method for playing a game, wherein the gaming system includes cross platform persistent gaming sessions using a mobile device. The embodiments are illustrated and described herein, by way of example only, and not by way of limitation. Referring now to the drawings, there are shown illustrative examples of games, gaming machines, gaming systems and methods for playing a game in accordance with various aspects of the gaming system which includes enhanced mobile control for electronic gaming machines (EGM) and tables.

An example in accordance with one or more aspects of a disclosed embodiment is shown in the figures. One embodiment of a gaming system 100 includes use of a mobile device 110. One particular aspect involves leveraging mobile devices 110 to enable players to play a game 120.

Thus, in one embodiment, a mobile device-enhanced system 100 enables interaction with an EGM 130 via a player-held mobile device 110 such as a smartphone. One embodiment of this mobile device-enhanced system 100 uses streaming video technology to deliver the game content 120; however, other embodiments of this system may also use conventional thick-client technology (i.e., all or most of the required content and processing are located and performed at the client instead of being transmitted from another source).

FIG. 1 shows an example of an Alpha 2 EGM 130 executing the game "Total Blast," which was developed by Bally Gaming, Inc. This game drives three video displays: the main screen, the top screen, and an iDeck (or other virtual button deck). The EGM 130 also has a display driven by an iView (or other player tracking module) and associated peripherals, such as a player tracking card reader.

In one embodiment of the mobile device-enhanced system 100, a player inserts a player tracking card into the card reader before commencing wagering. This action of inserting the player tracking card associates the wagering session with their player account. In this embodiment of the mobile device-enhanced system 100, the player also has in their possession a mobile device 110, preferably a smartphone. This smartphone has an application loaded into it that is capable of receiving and displaying a video stream over a network 140 and passing player input back over the network in reaction to events displayed in the video stream. The application is also capable of communicating with a game server 160 over a network 140 to establish game sessions. Moreover, in this embodiment of the mobile device-enhanced system 100, the EGM 130 is also running application software capable of receiving video streams and displaying the video streams, along with software to control passing player input back over the network 140 to a game server 160.

Figure 2:
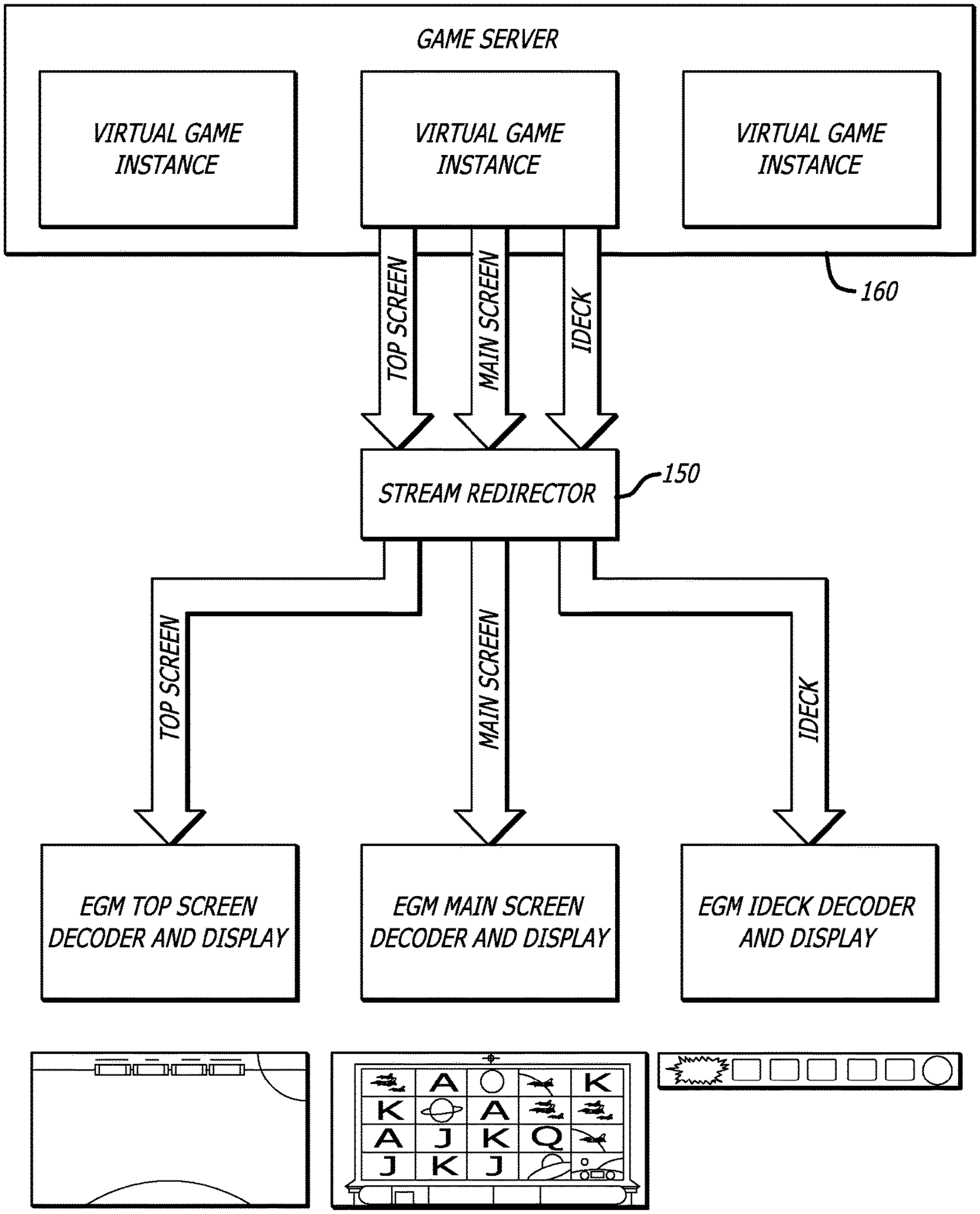
FIG. 2 illustrates the game Total Blast as served by streaming server to an electronic gaming machine.

Referring now to FIG. 2, a system configuration is shown that illustrates how the video streams from the game "Total Blast" may be directed to the EGM 130 using the mobile device-enhanced system 100. In this embodiment of the mobile device-enhanced system 100, there is a Stream Redirector module 150 interposed between the game server 160 and the EGM 130. In some embodiments, the Stream Redirector module 150 is employed as a display manager that manages the game display on the gaming machine. This Stream Redirector module 150 may not be a physical module (i.e., the Stream Redirector module 150 may be a software (or virtual) module). In this embodiment, the Stream Redirector module 150 is depicted as a separate module. Also for the purposes of clarity, player input is not shown in FIG. 2. In this embodiment of the mobile device-enhanced system 100, player input passes in the opposite direction from touchscreen displays to the Stream Redirector module 150 and into the virtual game instance.

As disclosed herein, one or more games may be streamed to a gaming machine 130 or a mobile device 110 over a network 160 such as the internet, a wireless network, or the like. The gaming machine 130 and/or mobile device 110 which is bound to receive graphical data from the server 160, may include a network interface, a decompression module for each display and/or each compressed data stream, video memory, a video encoder for each display, and displays.

The server 160 may include software executable on one or more processors, one or more graphics processors, video memory associated with the one or more graphics processors, one or more compression modules, and a network interface. In other embodiments, the server 160 streams a plurality of games to a plurality of gaming machines 130 and/or mobile devices 110 connected to the network 140.

The software may include software for one or more games 120. In some embodiments, a processor, graphics processor, video memory, and compression module may be dedicated for each instance of gaming software. In other embodiments, one or more of the following may be dedicated for each instance of gaming software: a processor, graphics processor, video memory, and compression. For example, in some embodiments, a single processor may execute each instance of gaming software, but transmit graphical data to one or more graphics processors reserved for each of the games (i.e., four graphics processors, one for each game). Other embodiments may have different configurations of these and other components.

The one or more graphics processors receive graphical data generated as a result of the software being executed on the one or more processors. Upon receiving graphical data, at least one graphics processor renders the data into a frame of a particular format and may store the rendered frame in video memory. At least one compression module may then receive the frame for compression, and compresses (i.e., encode) the frame. Once the frame is compressed, the compressed frame may be sent to the network interface for transmission via a transport protocol over the communication network to the gaming machine 130 and/or mobile device 110.

In some embodiments, one or more system components may be added or removed from the system. For example, in some embodiments, some or all of the graphical data generated at the server 160 may not be compressed by a compression module prior to transmission to the gaming machine 130 or mobile device 110. Therefore, the server 160 may not include one or more compression modules. Otherwise stated, some or all of the graphical data may not be compressed after being rendered by a graphics processor.

In the embodiment, the gaming machine includes a display manager (e.g., stream redirector 150). In other embodiments, the server 160 may include one or more stream redirector 150 instead of the gaming machine 130 (e.g., one for each gaming machine). In yet other embodiments, a network component such as a router may include a stream redirector 150 instead of the server 160 or gaming machine 130. In yet further embodiments, the server 160, gaming machine 130, a network component, or combinations thereof may include a stream redirector 150.

The stream redirector 150 conducts display management processing on graphical data, which may include rescaling (e.g., resizing) and repositioning (e.g., changing display area coordinates) the graphical data while maintaining the aspect ratio of the graphical data. For example, the display management processing may assemble or composite two or more streams of graphical data into a single stream of graphical data. Otherwise stated, the display management processing may take two frames of data and convert them into a single frame of data. In addition, the stream redirector 150 may receive touch data (i.e., touch signals) from the displays, route the touch data, and conduct coordinate transformations if necessary, to the processor executing the game 120 with which the touch data is associated.

In yet another embodiment, the mobile device-enhanced system 100 may employ an EGM 130 that incorporates a Bluetooth transmission system. In such an embodiment, when a player is seated at the EGM 130, an application running on their mobile device 110 is also Bluetooth-enabled and is in communication with the EGM. This establishes a link between the game session and the mobile device 110. When the player moves out of Bluetooth transmission range from the EGM 130, or the Bluetooth transmission link is otherwise broken, the game session link may continue to be active from the game server 160, even though it is not continuously connected.

Figure 3:
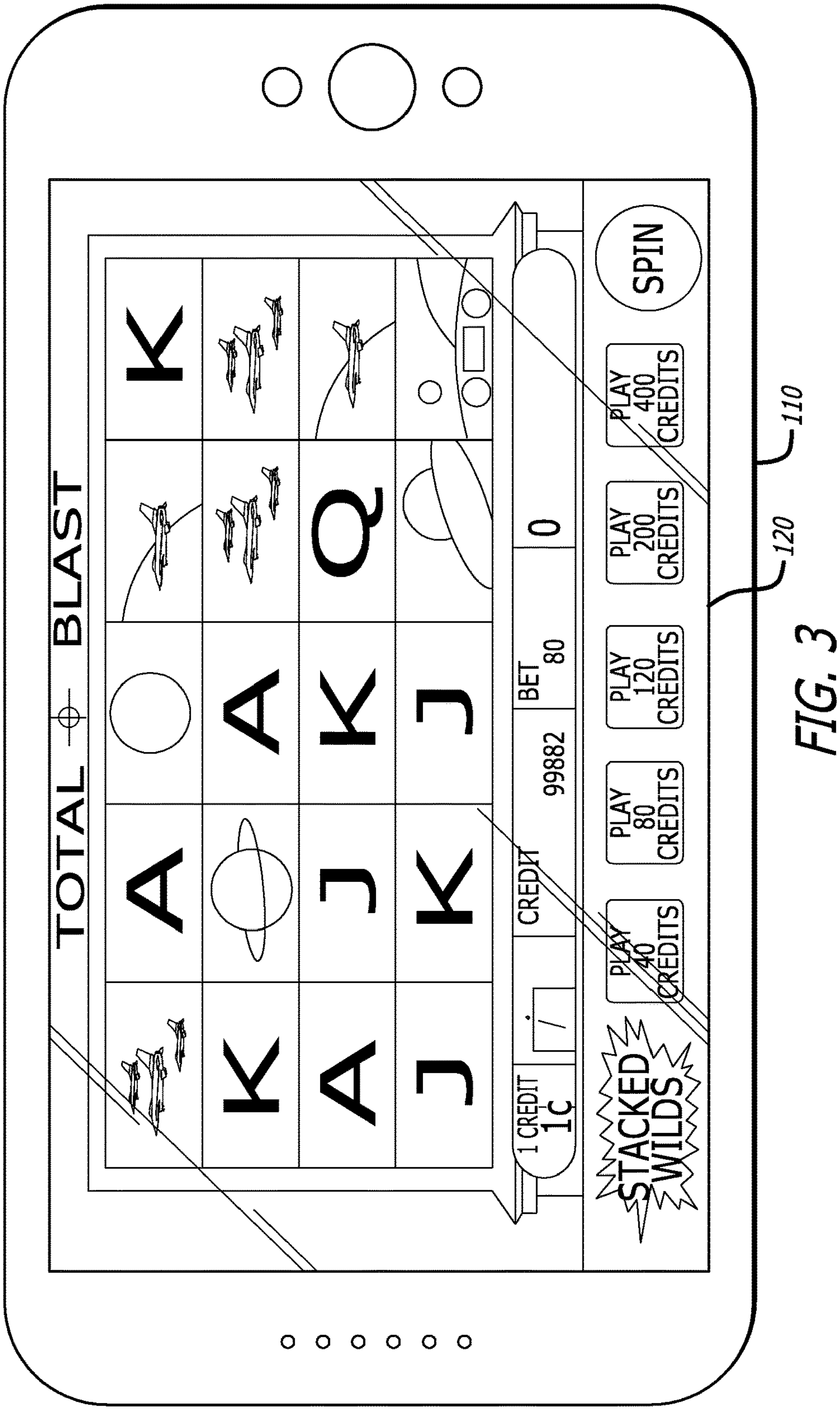
FIG. 3 illustrates a main screen and iDeck (e.g., virtual button deck) streamed to mobile device.

Referring now to FIG. 3, an embodiment is shown using the mobile device-enhanced system 100 that illustrates how the "Total Blast" game may be presented to the player on the player's mobile device 110. It should be noted that this display on the player's mobile device 110 typically consists of two video streams (or audio-video streams) mixed together into one; the Main Screen stream, along with the iDeck (virtual button deck) stream.

Figure 4:
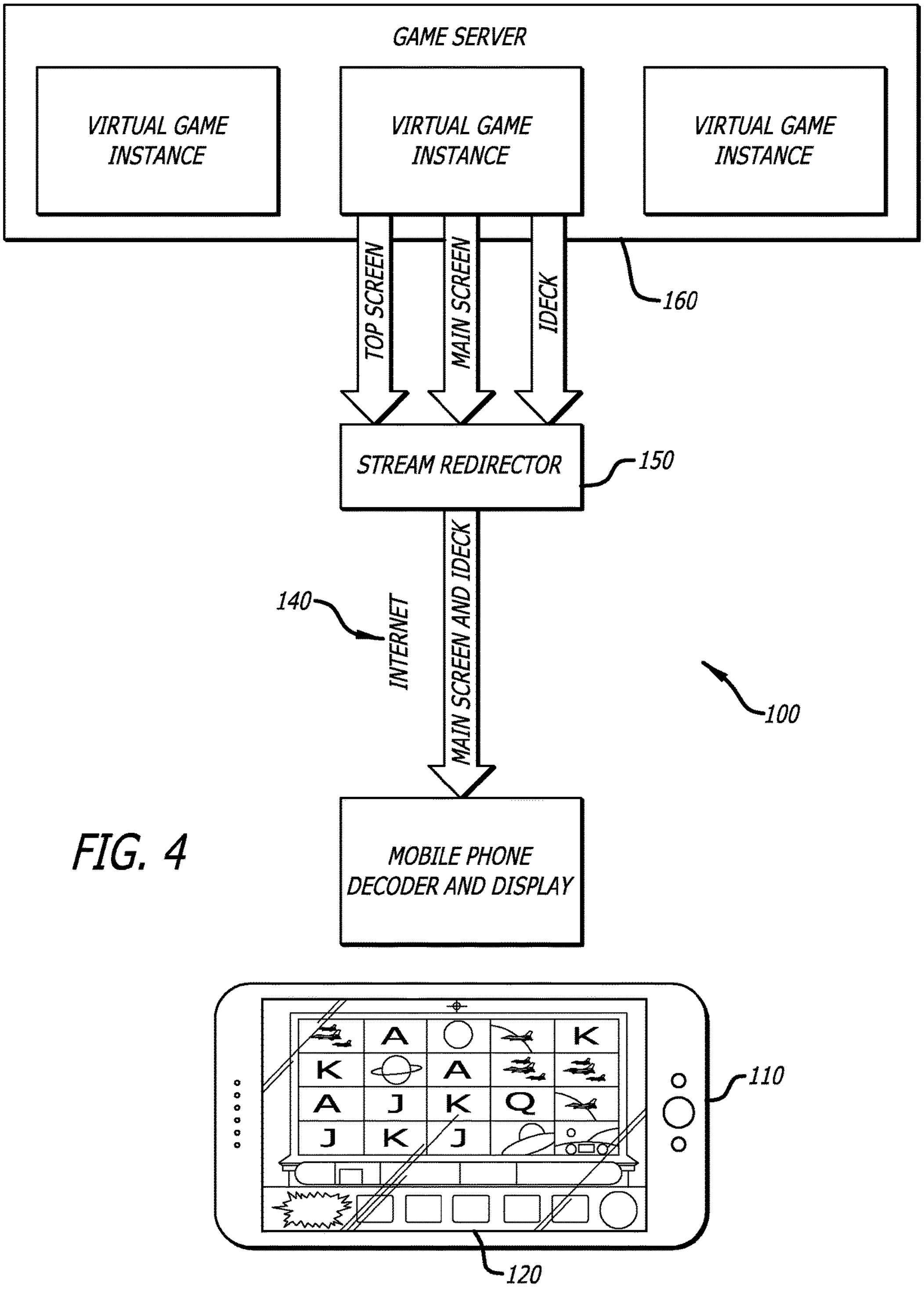
FIG. 4 illustrates the game Total Blast as served by streaming server to a mobile device.

Referring now to FIG. 4, a configuration of the mobile device-enhanced system 100 is shown that illustrates how the mobile connection is established. From the perspective of the virtual game instance, nothing has changed with respect to executing the game logic and rendering the graphics of the game. The operation of the Stream Redirector module 150 has changed however. The Stream Redirector module 150 now re-encodes both the main screen streaming content and iDeck streaming content into one combined stream of content. This re-encode process may also adjust the screen resolution and bitrate of the resulting stream of content to better suit the capabilities of the mobile device 110 and/or network 140. In embodiment of the mobile device-enhanced system 100 that employ games in which all three screens are necessary (e.g., the top screen is functional) for a game to perform correctly, the Stream Redirector 150 may perform more complex logic to support the merging of all three streams of content.

In another aspect of the mobile device-enhanced system 100, when a player touches a relevant point of the display on the player's mobile device 110, the coordinates are remapped by the Stream Redirector module 150 into the original resolution of the display, and passed back to the relevant touchscreen input of the virtual game instance. This remapping of the touchscreen coordinates assists in compensating for varying screen sizes and proportions between the display(s) of the EGM 130 and the display of the player's mobile device 110.

When using the mobile device-enhanced system 100, once a virtual game's content streams are redirected towards a mobile device 110, the EGM 130 begins a new gaming session. In some embodiments, this gaming session is of an identical game 120 (but different instance) to the game 120 that was redirected to mobile device 110. In other embodiments, another game may be chosen by the game server 160 to be executed on the EGM 130 (that is different than the game being shown on the mobile device 110), dependent upon heuristics such as the time of day, number of patrons in casino, or other data.

While the above embodiments of the mobile device-enhanced system 100 have been discussed with respect to the use streaming technology to deliver the content to the display devices (e.g., the mobile device 110, the EGM 130, and the like), other embodiments of the mobile device-enhanced system 100 use conventional 'thick-client' technology. In some such implementations, the mobile device may not be "trusted" (by gaming regulation standards), so a persistent network link would be used to host the game outcome in a secure server-based environment.

In such an embodiment, instead of stream redirection, both the EGM 130 and the mobile device 110 would host software applications implementing the game presentation. At the point where the game is "transferred" from EGM 130 to mobile device 110 or vice-versa, the game state instead would be transferred along with meter values to the new client. In the case of moving to the mobile device 110 (if the EGM 130 has been actually performing all of the game logic without a server), a new game virtual instance would be created at the server 160 for hosting the game 120 on the "insecure" mobile device 110. When moving from the mobile device 110 to a non-server based EGM 130, the data from the virtual instance would be passed to the EGM, and then the virtual instance of the game 120 would be shut down.

Moreover, preferred embodiments of the mobile device-enhanced system 100 typically include structural and/or operational features such as: (1) seamless transfer of game play between mobile devices 110 and EGMs 130 (and vice-versa); (2) saving of gaming session for resumption later, either on a mobile device 110 or on an EGM 130, and (3) use of mobile device 110 as alternative input device to EGM 130.

Figure 5:
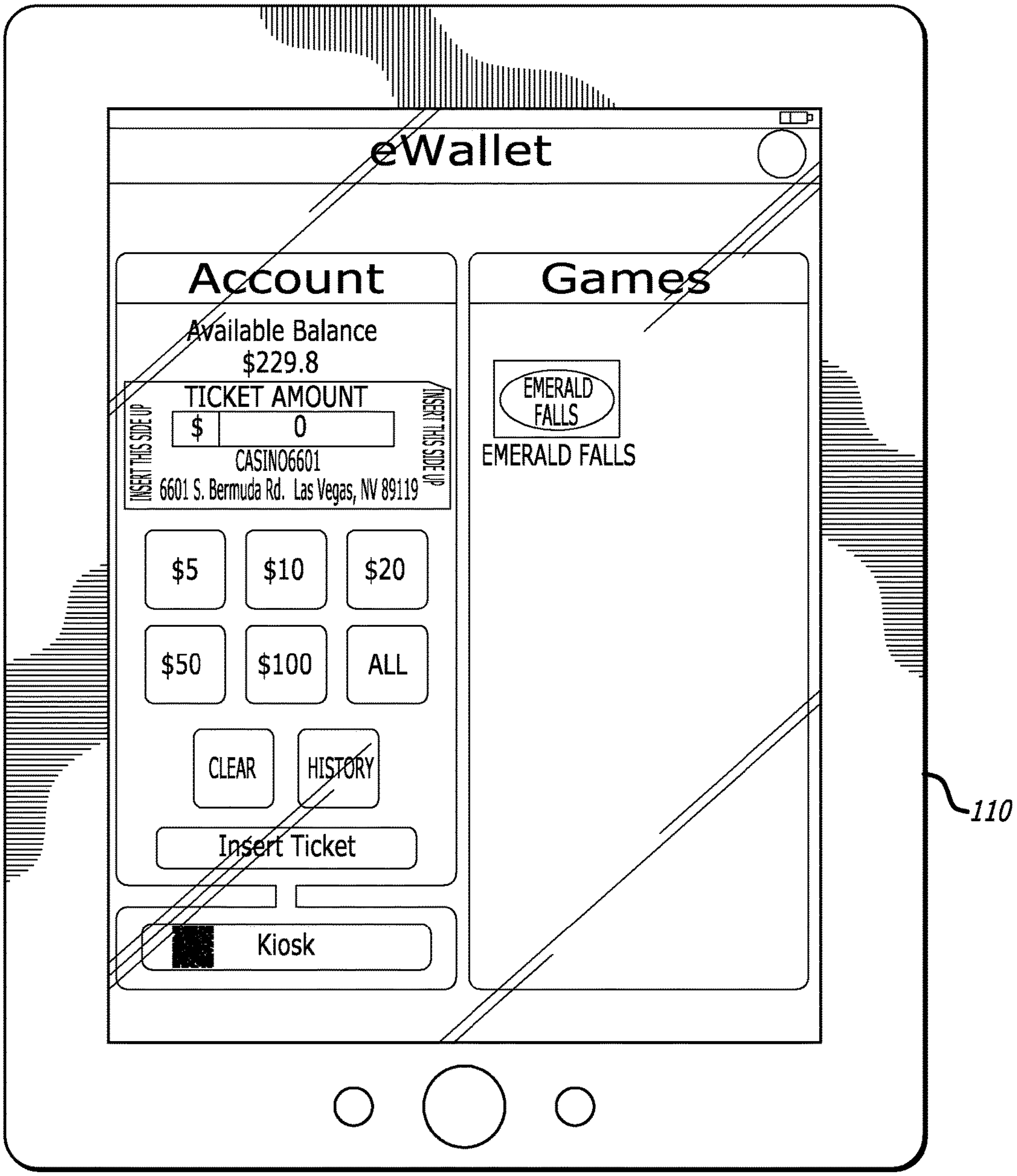
FIG. 5 illustrates an embodiment of a mobile wallet application.
Figure 6A:
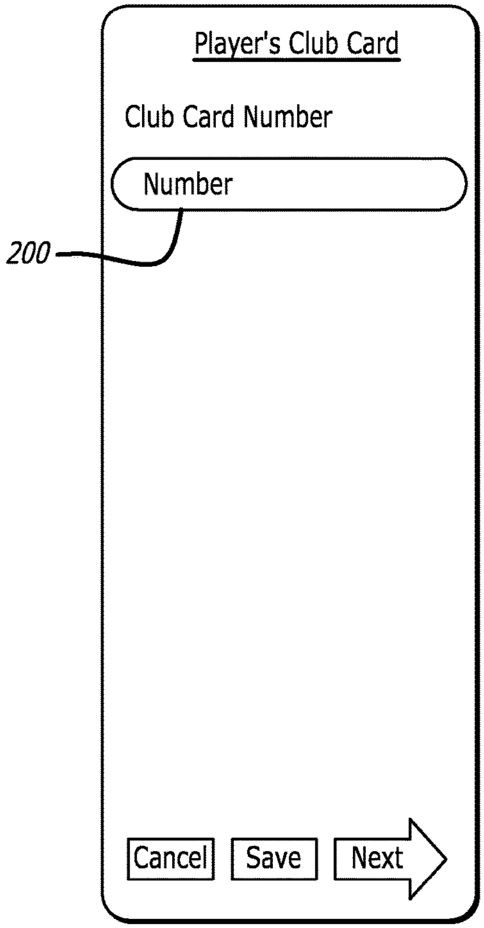
FIG. 6A illustrates an example of a mobile phone payment application.
Figure 6B:
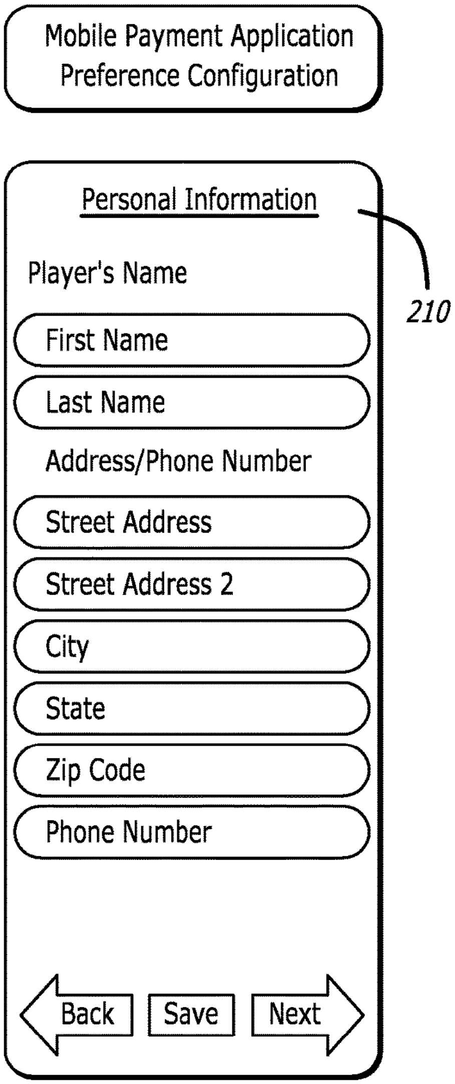
FIG. 6B is another view of a mobile phone payment application.
Figure 6C:
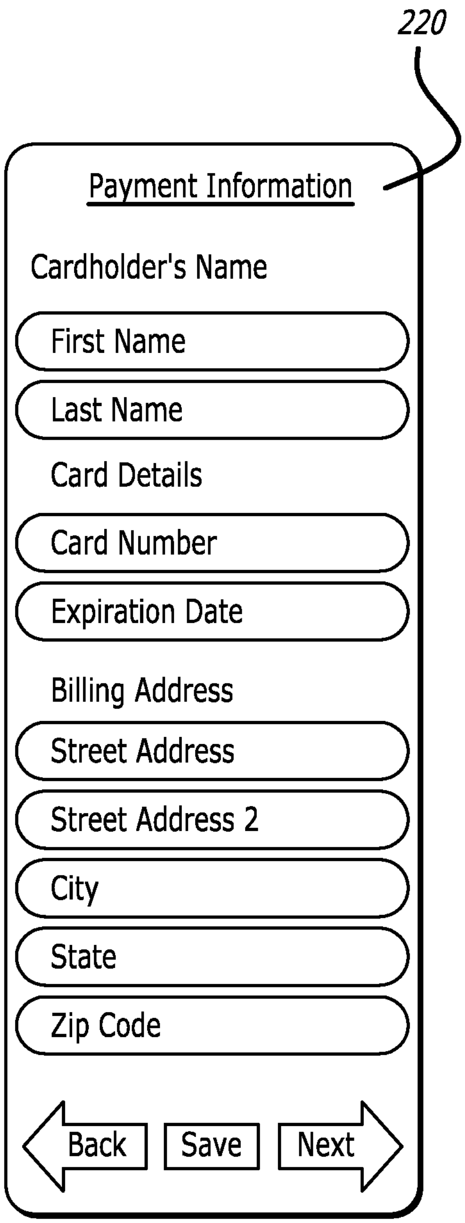
FIG. 6C is another view of a mobile phone payment application.
Figure 6D:
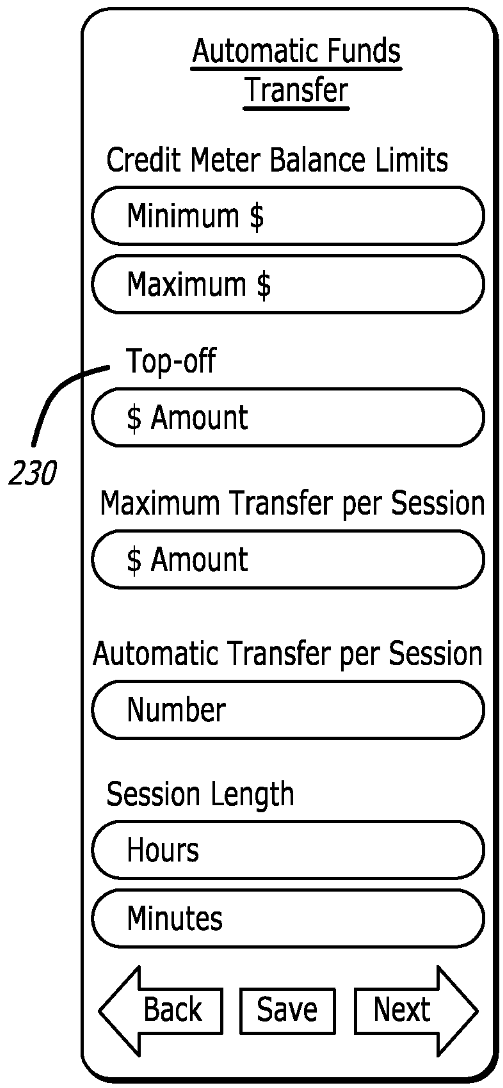
FIG. 6D is another view of a mobile phone payment application.
Figure 6E:
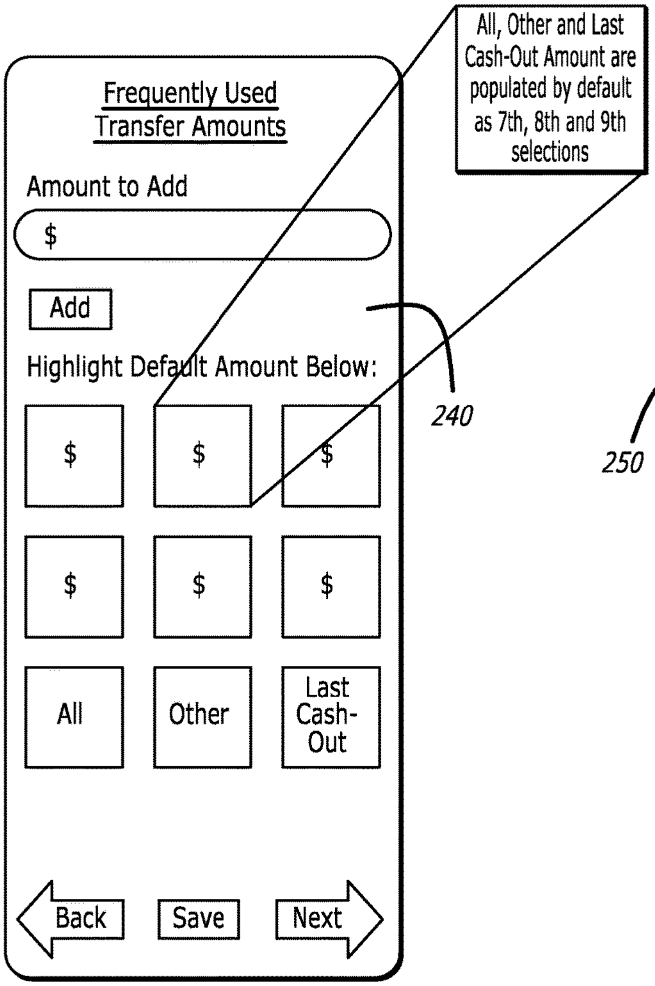
FIG. 6E is another view of a mobile phone payment application.
Figure 6F:
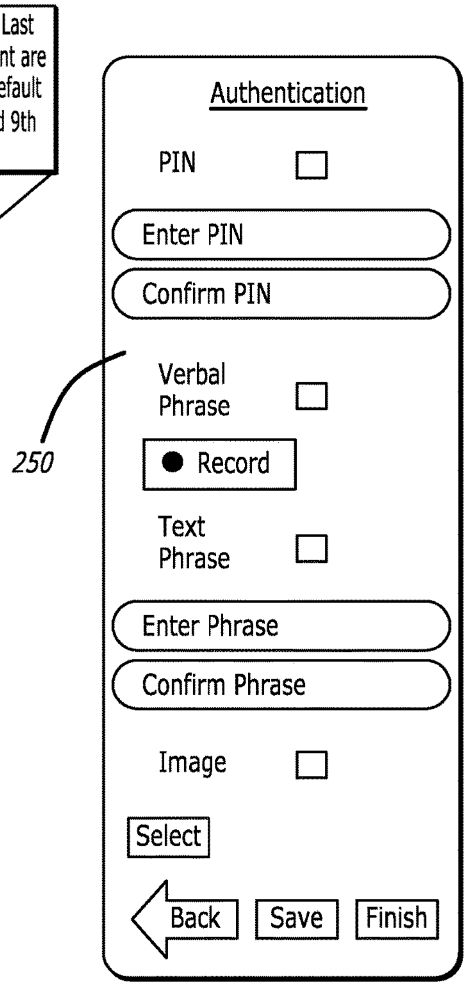
FIG. 6F is another view of a mobile phone payment application.

An embodiment of this mobile device-enhanced system 100 enables players to play game sessions across mobile and conventional EGM platforms as shown in FIG. 5. Additionally, some aspects of this mobile device-enhanced system 100 are directed towards the transfer of funding between electronic gaming machines, mobile devices, and paper tickets, as well as cash/credit cards.

In an embodiment of this mobile device-enhanced system 100, the mobile device 110 acts (from the player's perspective) as a mobile wallet. However, in actual implementation and functionality, the mobile device 110 does not store the funds. These financial transactions are stored in a database on a server. The mobile device 110 must therefore have network connectivity to be functional. This is a configuration that may be achieved through the use of smart phones and ubiquitous nature of network infrastructure, such as 3G or WiFi mobile phone networks. In a preferred embodiment of the mobile device-enhanced system 100, the mobile device 110 also has a rear-facing camera that is capable of acquiring QR codes or barcodes.

In one embodiment of the mobile device-enhanced system 100, the mobile wallet is configured to interface with via an application that is loaded onto the mobile device 110 (as well as on kiosks and EGMs 130).

In one embodiment of the mobile device-enhanced system 100, security levels are utilized for identification and/or authentication during the association process. These security components include identification and/or authentication of the device ID of the gaming machine and mobile device, the user name of the player, and the password of the player. In some embodiments of the mobile device-enhanced system 100, biometrics are used to assist in the security efforts of the employed to access the mobile device and the player's financial account. In such an embodiment, a biometric reader may be used which may take a variety of forms, for instance, a fingerprint reader, iris scan, microphone and voice recognition software, hand vein pattern detection, or combinations thereof. In alternate embodiments, a patron's written signature may be digitized and verified against a signature database. For example, a player may sign on a surface computer display with finger or stylus). Biometric analysis may be performed at the gaming system (e.g., table or arcade style gaming systems) or may be performed by remotely located remote system computer system.

Also, for example, a player's identity and proximity may be detected by the sensor subsystem or other subsystem of the gaming system. For instance, a transponder carried by a piece of media or a wireless communication device which is carried by or otherwise associated with a player may be wireless detected via wireless interrogation. The piece of media may take any of a variety of forms, for instance a loyalty program card, driver's license, credit, debit or prepaid card. Proximity data acquired by the gaming system may, for example, include a location in the casino (e.g., x, y, and z coordinates or GPS data). The gaming system or some other system may associate the proximity data with a player identifier. Based at least one part on the location coordinates, the system may create a logical relationship between the player identifier and a particular gaming system, a table identifier, seat identifier and/or player position identifier.

A player may identify him or herself at the gaming system by placing a piece of media (e.g., loyalty program or patron club card, driver's license, credit, debit or prepaid card) on the playing surface. A sensor subsystem may read the media, and a CMP/CMS system may identify the player from the read information. The display subsystem may display indicia representing cash and/or point balances one or more accounts associated with the player. The player may employ a user interface to transfer funds from their account, for example, to a credit meter of the gaming system or as virtual chips. The transfer may require entry and approval of a personal identification number (PIN), biometric data, and/or password. The user interface may include one or more user selectable icons displayed on or below the playing surface, or some separate device such as a PIN pad, keypad or keyboard, for example located at each seat. Transfers may employ appropriate security protocols and encryption, for example AFT or WAT transfer protocols of SAS or the GSA G2S class, respectively.

In some embodiments, the mobile device-enhanced system 100 facilitates wireless transfer of funds from a personal computing device and/or wireless communication device capable of performing funds transfer using the Mobile Wallet inside the device, from a remote financial institution, or from other points or cash funds account. Personal computing and/or wireless communication devices may take a variety of forms, for example a cell phone, iPhone, personal digital assistant (PDA), laptop computer, BLACKBERRY, TREO and other such devices. The device may establish wireless communication with the table or arcade style gaming system or with a casino patron account. Funds may be debited from or credited to the device or a remote financial account. The communication protocol may take a variety of forms, for example, Bluetooth or Wi-Fi, but other standard networking protocols are envisioned as long as the protocols support security via authentication and/or encryption of the transmissions and transactions.

Historically, casinos have used Ticket-In-Ticket-Out (TITO) technology as a way of simplifying funding of slot machines. TITO allows a casino to remove hoppers and coin acceptors. It also reduces use of bill acceptors. TITO has the disadvantage that it requires the use of tickets that must be loaded into EGMs. These tickets are usually printed on thermal paper stock, and thus the casino has to factor in the cost of purchasing this paper as well as maintenance of the ticket printers.

Here, TITO is either somewhat or eventually completely replaced by a mobile phone application operated by the player on their own personal mobile phone. As stated above, this disclosure provides an approach to using existing smart phones where there is no requirement for near field or any extra hardware. The disclosed approach uses existing casino systems infrastructure and does not require any additional peripherals, and involves an easy to understand set of transactions for players. Ongoing play is available through further credits being added by the player easily and can replace TITO infrastructure, or can be used in parallel with TITO. There is additionally player acceptance of security models where financial transactions can take place on their phone, and not the EGM. Integration with wide range of funding is possible such as bank accounts, Google Wallet, and Paypal. Moreover, jurisdictional requirements are met in that funding need not take place at an EGM, and multiple authentication methods are supported. Thus, moving between EGMs and cashing out is convenient for the player. Rules for auto-funding (when available) and loss limit possible for harm minimization, and rules for moving excess funds from a successful session back to wallet are also provided. In one particular embodiment, existing player tracking interface infrastructure such as iView or iView DM, existing slot machines, Bally CMS such as SDS, and Smartphone with data connection are contemplated to be used.

Thus, using this approach, push notifications to mobile phones can be used to initiate transfers to and from an E-wallet. Further, optional subsequential transactions are possible without authentication, so a player can add further money at an EGM without re-authenticating. Automatic transfers back to an E-wallet on leaving an EGM is further possible as are push notification to a phone to update wallet display. Moreover, wallet enforced rules for loss limits for harm minimization are provided as are rules for successful play, and moving excess back to an E-wallet.

The player typically installs this application on their phone by receiving and activating a link to a URL supplied by the casino. This link may take the form of a printed QR code or be contained in email promotions.

As shown in FIGS. 6A-6F, a player may configure the mobile phone application when installed. First, they associate the phone with a player card number 200. This allows the CMS to link the phone to card-in and card-out events at a particular EGM.

Secondly, after entering personal details 210, 220, the player may configure rules for the transfer of funds to EGMs 230. The player may associate existing bank account or a 3rd party wallet (such as Paypal or Google Wallet) with the phone application as sources of funding. Further, the player may set rules as to when funds may be automatically transferred—such as when credits reach a minimum. They also may set harm minimization rules—ending sessions after a period of time or limiting the amount transferred during a session. A player may also set a maximum amount on the EGM credit meter. If the player is successful in their gaming session, and hits a win that takes them over the maximum credit meter their excess funds may be immediately transferred back into the phone wallet.

A player may also set up frequently used transfer amounts 240. For example, a player may preferably be populated with standard amounts such as $20, $50, $100 and $200.

Finally, a player may set their preferred authentication method, be it PIN, facial recognition, password or even none 250.

Once installed and configured, the application is enabled for 'push notifications'. This is a class of signals that is supported by all major phone platforms. A push notification is a signal that causes the application to become active, and can be sent over the internet. Once active, the application may communicate with a server interactively. In this invention the server would be connected to the casino CMS.

Figure 7:
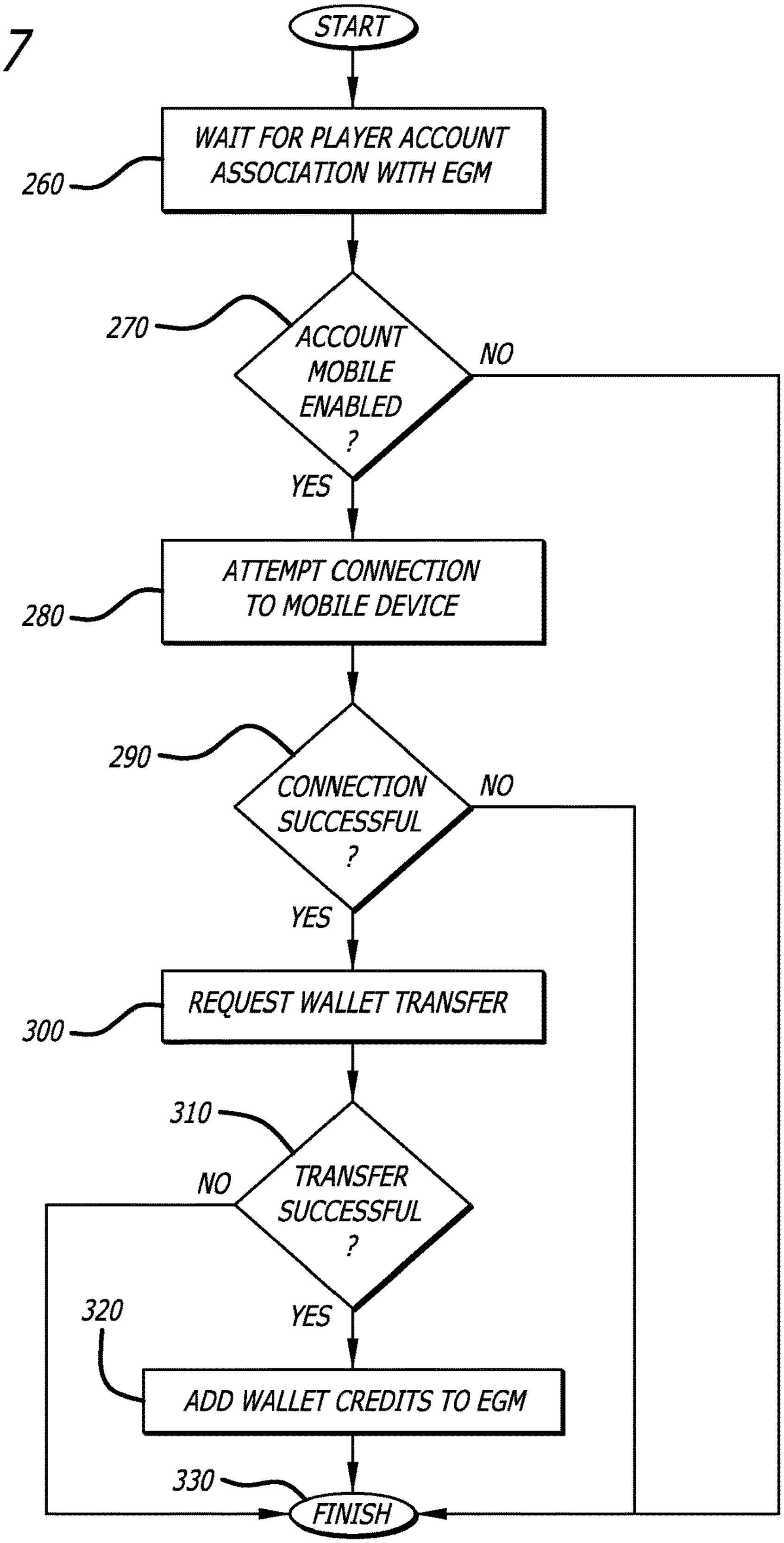
FIG. 7 illustrates a process to transfer a wallet to an electronic gaming machine.
Figure 8:
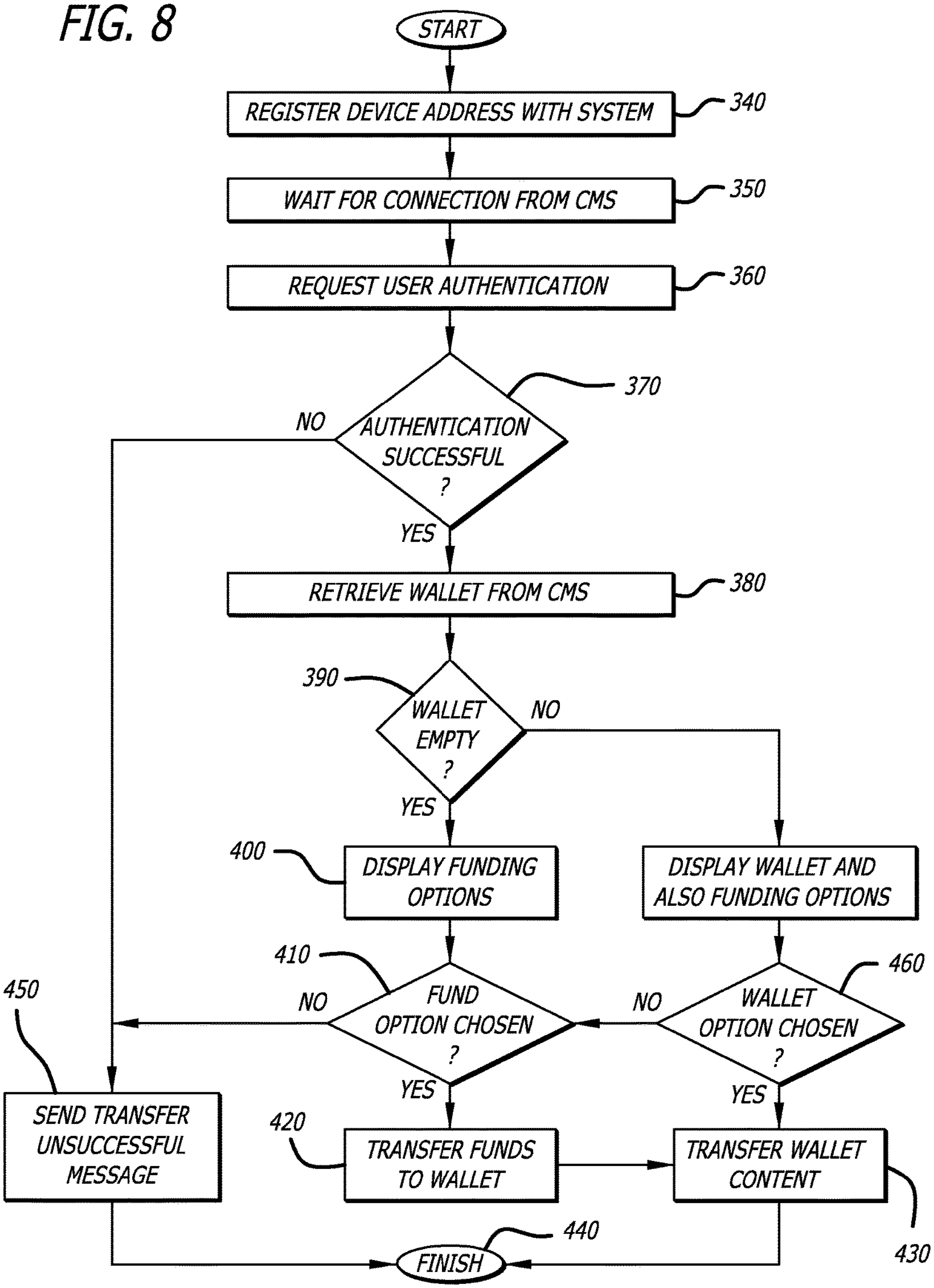
FIG. 8 illustrates a second process to transfer a wallet to an electronic gaming machine.

Assuming a player has installed the application, they can then go to the casino and insert their player tracking card into an EGM as normal. At this point, the CMS and mobile phone processes shown in FIGS. 7 and 8 can be performed.

Looking at the server side first, inserting the player tracking card associates a player with the EGM 260. This invention is not limited to just player tracking cards. Using previously "mobile tickets', a player may also associate their wallet or phone with the EGM by scanning a QR code attached to the EGM or EGM display, or by other means such as Bluetooth communication, Indoor Positioning Systems or biometrics such as facial recognition. Thus, once a waiting period for player account association with an EGM has completed, the system asks whether a mobile account is enabled 270. If so, a connection to the mobile device is attempted 280. Where a connection is successful 290, a wallet transfer is then requested 300. A query is then made as to whether the transfer was successful 310. Wallet credits are then next added to an EGM 320, and the process finishes 330. It is to be further recognized that the CMS process to transfer a wallet to an EGM also completes or finishes 330 where the mobile account 270 is not enabled, and where a wallet transfer is not successful.

If the player tracking account indicates an active mobile phone linked to the account, the CMS sends a push notification to the phone. If this is successful, it requests a transfer from the wallet. For example, in one approach (See FIG. 8), a mobile device is registered with the system 340, and after waiting for a connection with the CMS 350. Next, user authentication is requested 360 and where authentication is successful 370, the E-wallet is retrieved through CMS 380. If there are no credits in the wallet 390, funding options can be displayed 400. The player is then presented with funding options for selection 410. The player is next asked to transfer credits or funds to a wallet 420, followed by the transference of a selected wallet content 430 which then completes the process.

Should authentication 370 be unsuccessful the process also finishes 440 without a transfer of funds and a send transfer message can be sent 450. The process can alternatively finish when a player decides not to choose a funding option 460 or a wallet option.

Figure 9:
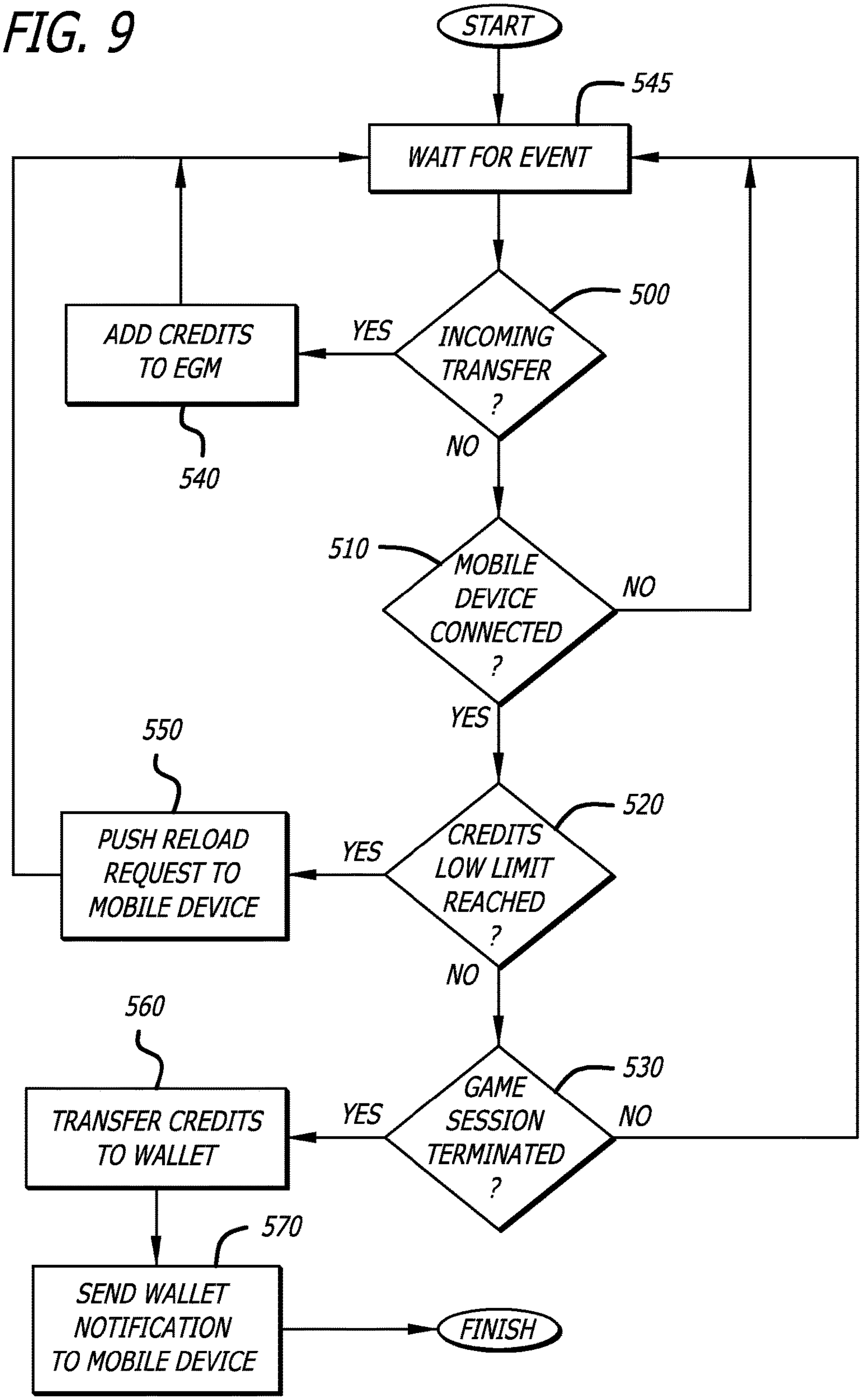
FIG. 9 illustrates ongoing transactions during a gaming session.

The push notification causes the mobile application to become active. Moreover, as shown in FIG. 9, during a gaming session ongoing transactions involving an E-wallet can include an incoming transfer 500, connection of mobile device 510, low credit limit 520, and termination of game session queries. If there is an incoming transfer, credits are added to an EGM 540. If a mobile device is not connected, the system is sent back to a waiting mode 545, as is done when a game session is terminated. If credits have not reached a low limit, a push reload request 550 is sent to a mobile phone, but if there are insufficient credits available, the game session is terminated 530. In this latter case, funds or credits are transferred back to a wallet 560 and the wallet notifies the mobile device 520. Preferably, when the mobile application shows active, the phone generates an audible or vibratory signal to the player, and displays a screen 600 (See FIG. 10).

Figure 10:
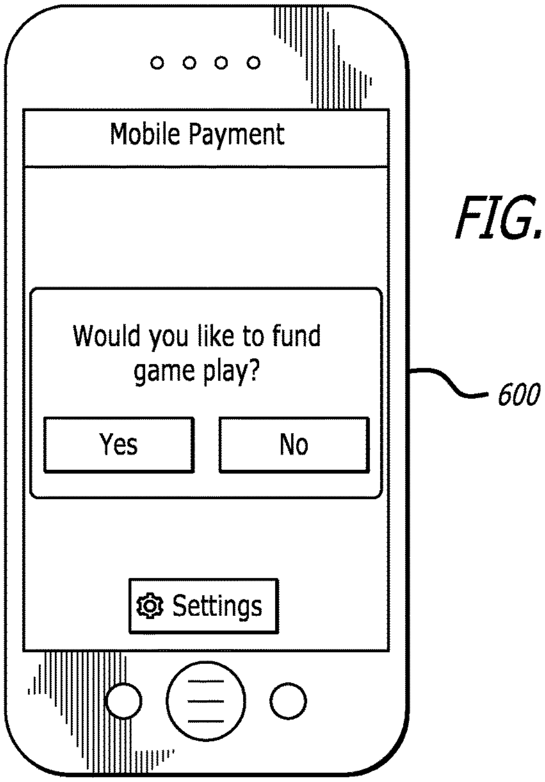
FIG. 10 illustrates a display of a mobile phone at initial connectivity.
Figure 11:
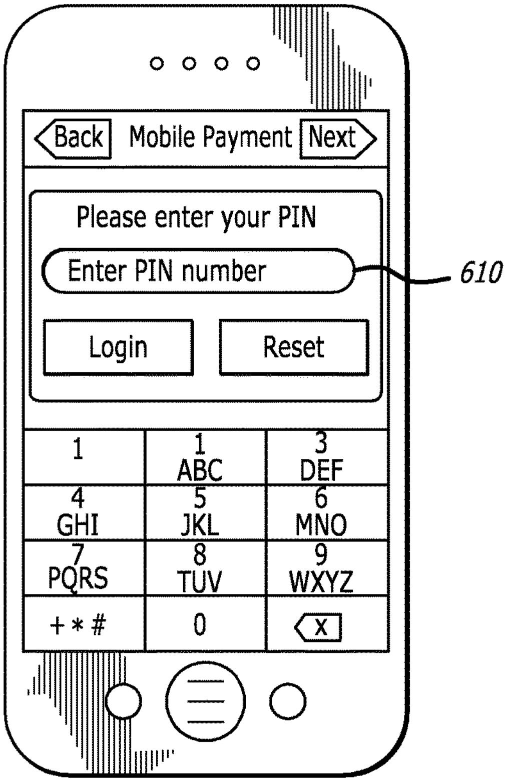
FIG. 11 illustrates a display of a mobile phone security approach.

As shown in FIG. 10, if the player chooses to fund the EGM from the phone they are then optionally presented with an authentication screen 610. Alternatively, or additionally, authentication may take place at the actual execution of transfer of funds described below.

Once authenticated, the mobile device retrieves the wallet status from the casino hosted wallet server (E-Wallet). If a player has existing funds in their E-wallet these are presented to the player with the option of transferring these funds directly to the EGM.

If the player has no funds in their E-wallet they may be presented with an option to transfer funds from an external source such as Paypal, Google Wallet or a bank account. The amount to transfer may be chosen from a set of fixed amounts (as configured initially) or an arbitrary amount chosen instead. This option may also be provided in addition if funds are available in the E-wallet. So if a player had, say, $12.13 in their E-wallet, they may elect to transfer this amount plus a further $20 from an external source.

If external funds are transferred, further authentication may be required through the external funding source. Alternatively, such authentication credentials may be cached in the mobile application, providing a player so desires.

The external funds, if sourced, are first transferred into the E-wallet and then along with any E-wallet value are passed to the CMS for transfer to the EGM.

Once received at the CMS, the wallet value is transferred to the EGM. A legacy slot machine sees this as an AFT transfer from the CMS and knows nothing about the mobile phone transactions.

It can be seen that this transaction is very simple for a player to navigate, and furthermore requires no extra infrastructure at the casino end beyond an internet gateway accessible by the mobile phone.

During game play, further transactions may take place (See for example, FIG. 9). In one approach, the CMS or iView monitors events from the EGM. Further incoming or outgoing transfers may be manually initiated by the player by using the mobile application. In the case of outgoing transfers, the CMS may periodically update the mobile application with the current credit level on the EGM. If a player initiates a transfer of all credits off the EGM, the session is ended and the credits are transferred to the E-wallet either by the mobile application or CMS. At a later point, or immediately if rules are configured on the mobile device, some or all of these funds may be transferred to the player's preferred funding source.

If a low (or high) credit limit is reached, a push notification is sent to the mobile device requesting (or sending) funds. In the preferred implementation the mobile device need not ask for further authentication at this point, but may ask to confirm the amount of transfer.

If the player presses 'cash out' or removes the player tracking card from the EGM, the credits are automatically transferred by the CMS or iView to the Ewallet. A push notification is sent to the mobile device so that the player is aware of this transfer. Furthermore, rules on the mobile application may then be acted upon to transfer some or all of these funds back to the funding source.

All transactions may be repeated when a player goes to another EGM and inserts their player tracking card. Authentication may be optional at this point, as long as a timeout period has not been met. If a timeout period has been met reauthentication should be mandatory and in one preferred implementation the player must opt-in to automatic authentication, one default for which is for authentication to occur upon insertion of a player tracking card into an EGM to ensure that a stolen mobile phone cannot be used to finish playing.

Figure 12:
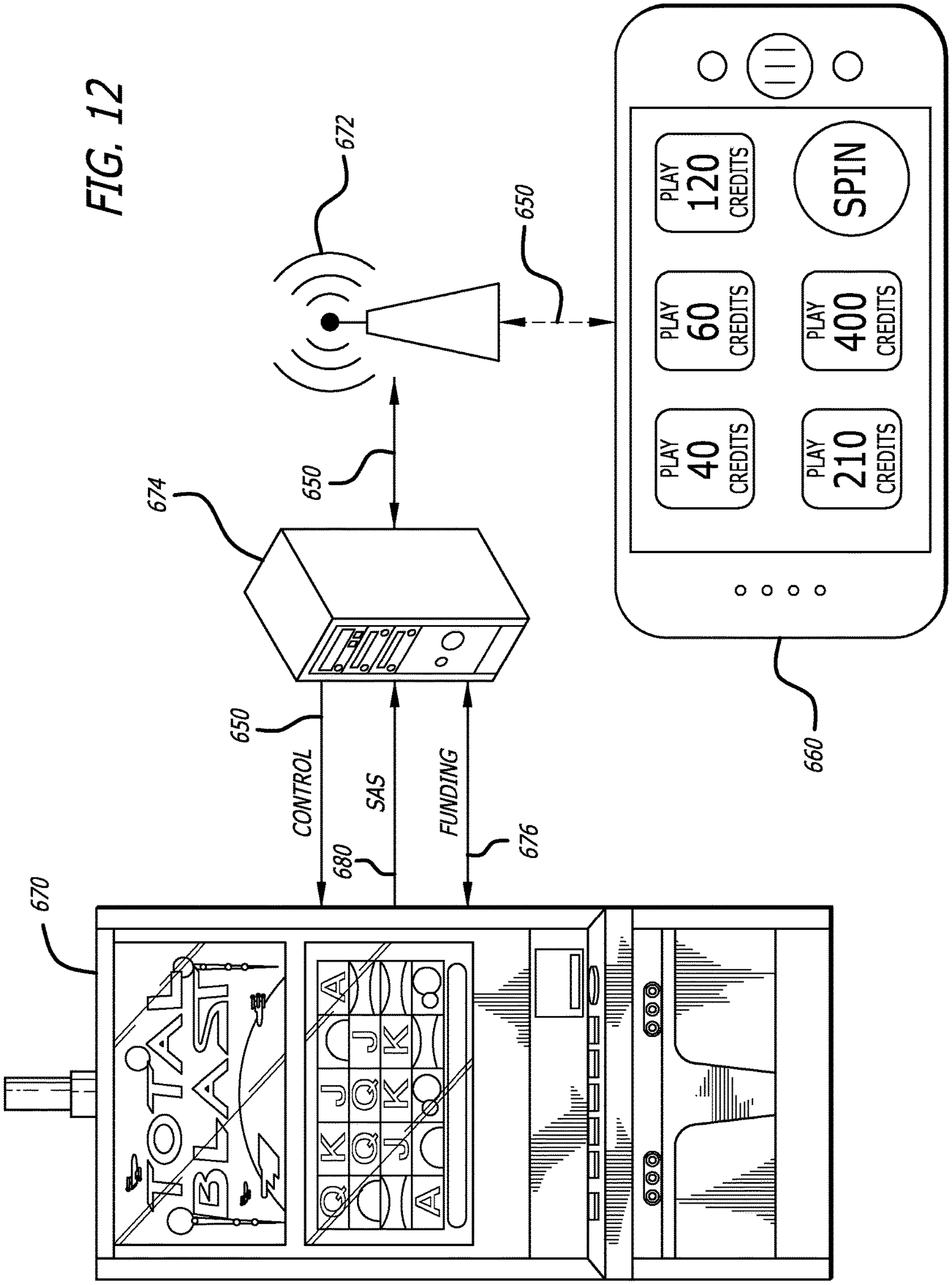
FIG. 12 illustrates an E-wallet integrated set-up.

Turning now to FIG. 12, there is shown an overview of how this disclosure would fit into an E-wallet enabled system. As before, funding functions (both from and to the EGM) are handled by the E-Wallet server and displayed on the mobile device. Here, two further paths are also enabled.

First, control signals 650 may be sent from the mobile device 660 to the EGM 670 to perform actions such as spinning reels. Such signals 650 are routed through a WiFi access port 672 and an E-wallet server 674. Funding communications 676 are also communicated between the server 674 and EGM 670. Secondly, performance data 680 is sent from the EGM 670 to the mobile device via the E-wallet server. To assuage regulator concerns, it is anticipated that this performance data is sent in a single direction only using an existing protocol such as SAS.

The purpose of this SAS data is to give players personalized information about this gaming session. By collating this data either at the server or mobile device, statistics can be provided to the player both for entertainment and informational reasons.

Figure 13:
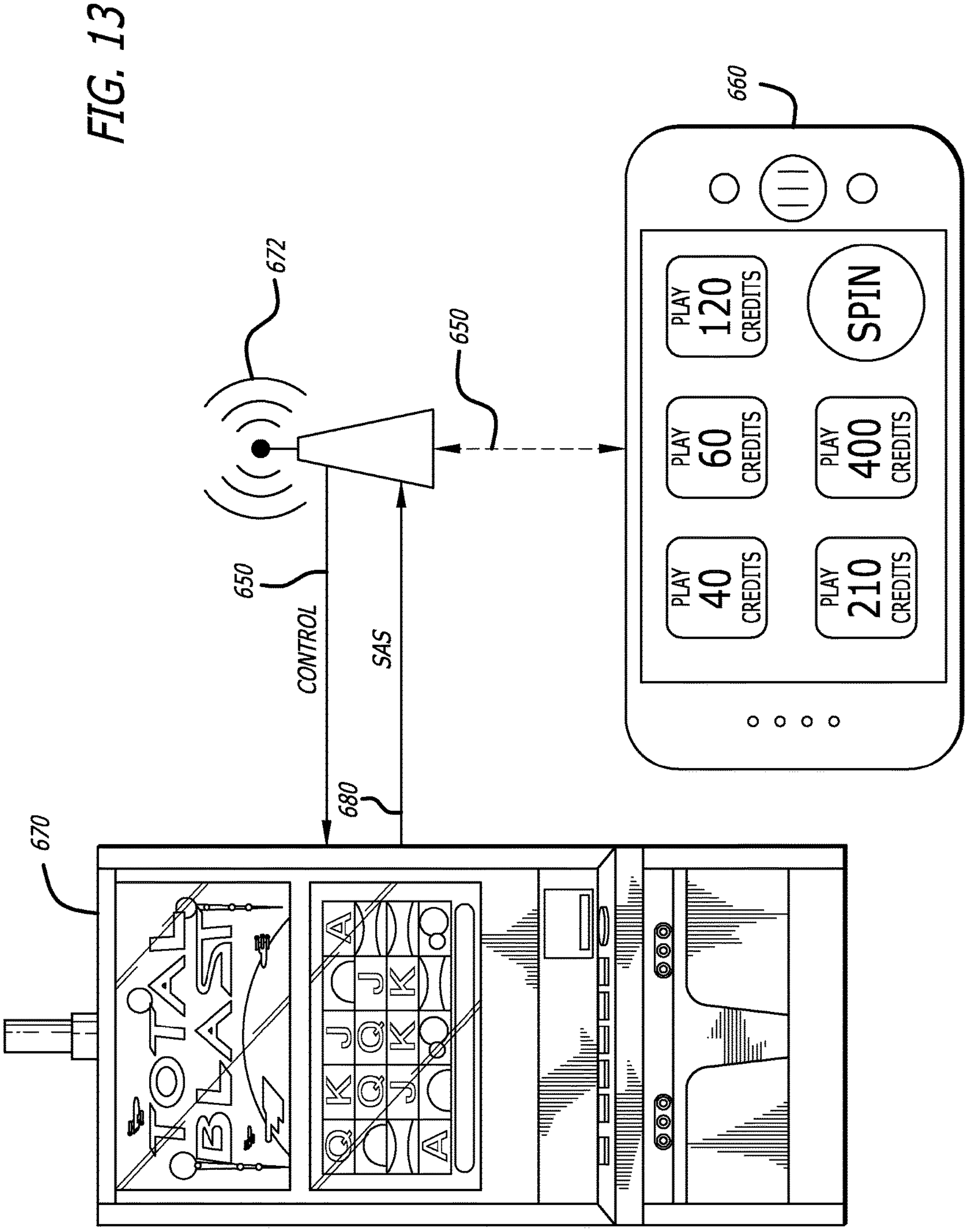
FIG. 13 illustrates one approach to a peer to peer set-up.

FIG. 13 shows a simpler setup without an E-Wallet. This system uses existing technologies such as Alljoyn by Qualcomm, to seamlessly connect an EGM to a mobile device in a peer-to-peer fashion. The association process may be automatic (if Bluetooth range is adjusted such that multiple EGMs 670 do not coincide) or by use of previously disclosed methods such as printed QR codes or NFC to broadcast an IP address for the EGM to the mobile device. Thus, a continued signal 650 is communicated directly from the mobile phone 660, through a WiFi or Bluetooth access or other point to an EGM 670.

Figure 14:
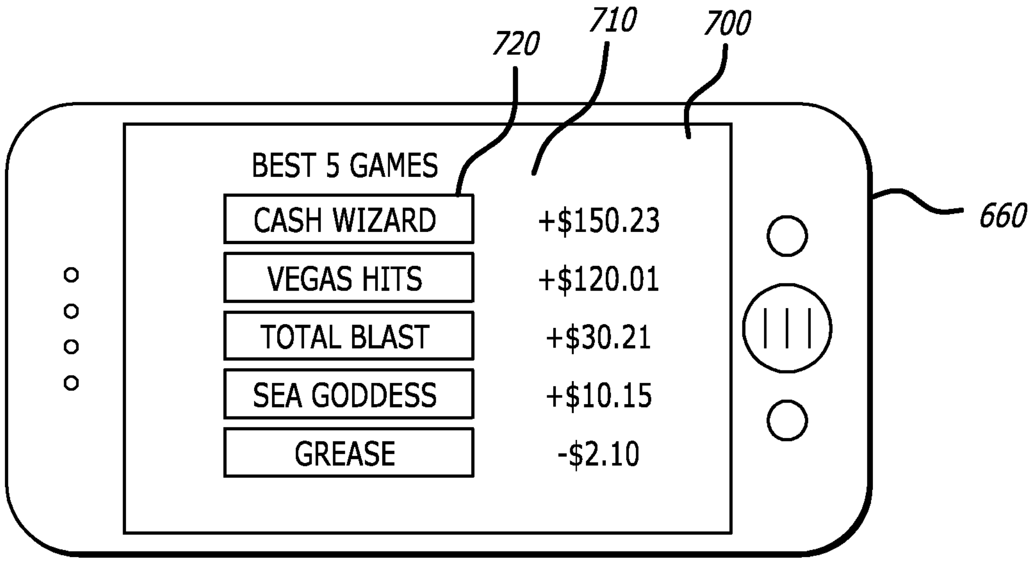
FIG. 14 illustrates one approach to displaying game history.

With reference to FIG. 14, there is shown an example display 700 of content that this disclosure allows to be possible. In this example, a player has brought up a menu 710 of game history on the mobile device 660. This history has either been collected by the E-wallet server 674 (See FIG. 12), and transmitted to the mobile device 660, or directly by the mobile device 660 itself (See FIG. 13).

Each game in the list in FIG. 14 is a game title that the player has played recently, along with performance. The games are ranked by performance with a color indicating the games which have been most successful for a player. A player could choose to use this information in any way, either as a reason to keep playing a particular game, or to try another one. Periodically, either under the player or casino control, this history would be reset so that data would not become irrelevant.

Figure 15:
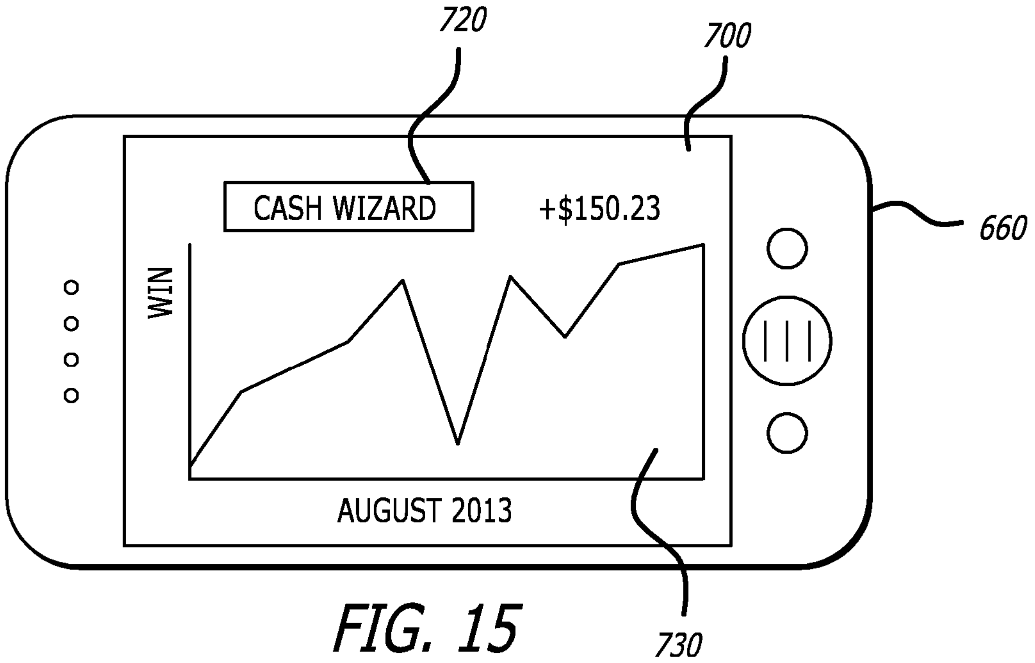
FIG. 15 illustrates one approach to displaying game specific information.

Turning now to FIG. 15, there is shown an example of further data a player may obtain about a game. In this example, touching a game title 720 brings up a graph 730 of performance for that particular game. In both examples, performance may also be for a particular EGM rather than a particular game. Thus, an EGM at a particular location may be perceived to be lucky by a player.

Figure 16:
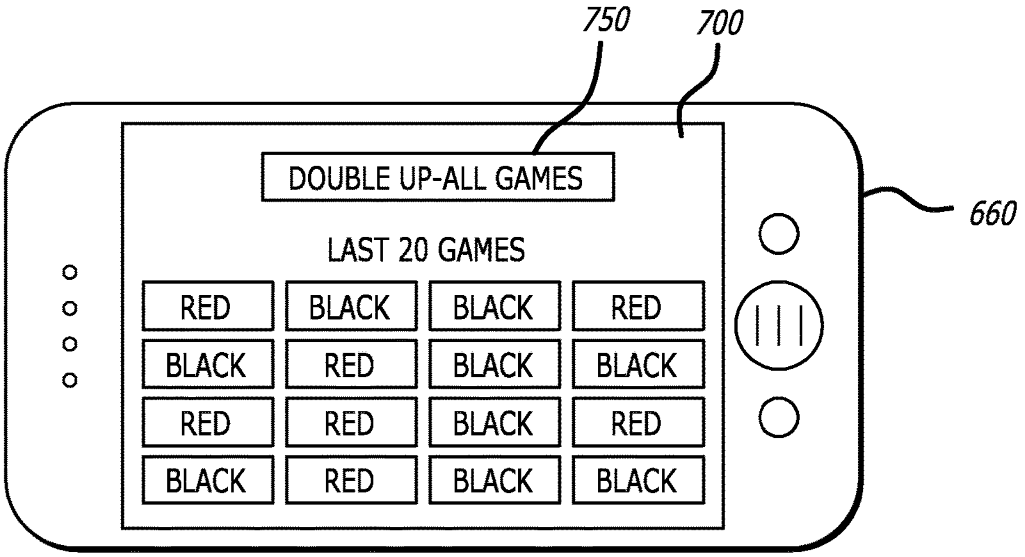
FIG. 16 illustrates one approach to displaying game data.

FIG. 16 illustrates an example of a game bonus feature that may be spread across multiple titles 750. In some markets, a 'double-up' feature is common, and operates identically across multiple different games. In this example, the player is presented with their double up history across every double up event, no matter what the game. This enables players to look for patterns not just at a particular EGM but across the floor.

Figure 17:
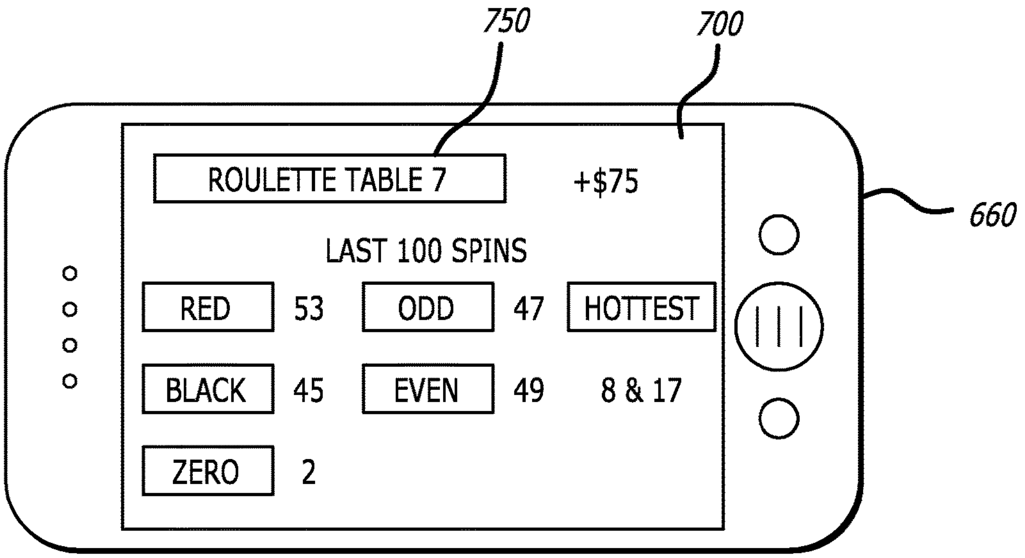
FIG. 17 illustrates one approach to display table game statistics.

Referring now to FIG. 17, an adaptation of this concept is presented for table games. Thus, players may use their mobile device 660 as a bet interface at table games. This approach augments that experience by providing statistics to a player of bet and win history. This can be important for games such as Baccarat or Roulette, where many players manually track game results looking for patterns. By delivering this content directly to their phone, the player feels assisted, and also does not feel that their data is being shared with the rest of the world.

Figure 18:
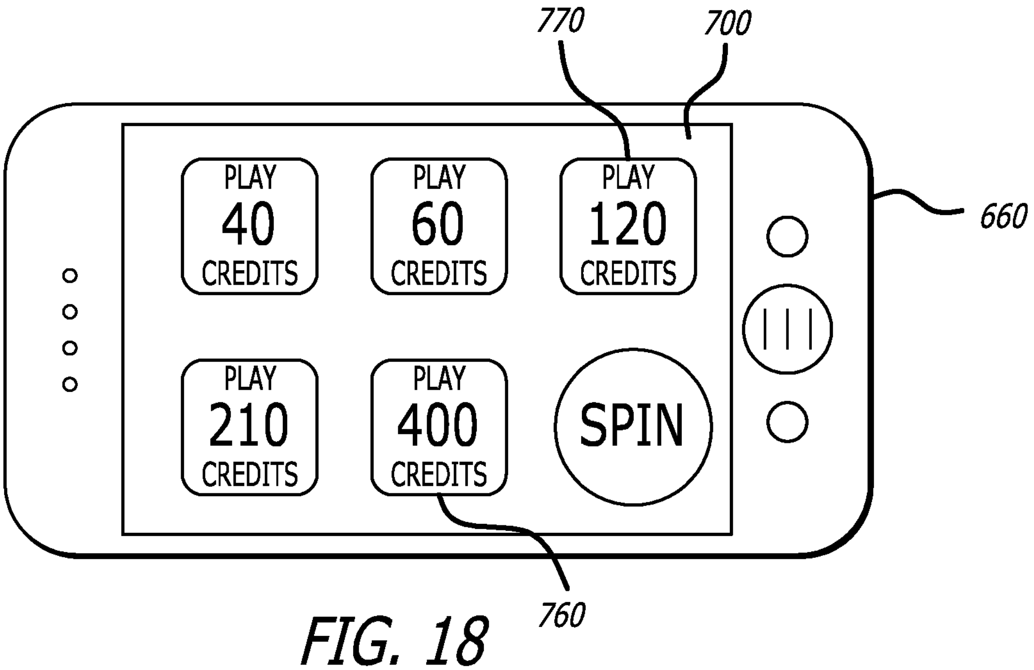
FIG. 18 illustrates a mobile phone display including a personalized enhance button deck.

FIG. 18 illustrates yet another approach, and in particular shows how a bet interface may be modified using statistics. In this case, the device or server 674 (See FIG. 12) has tracked game performance or trends for the player and indicates which of the buttons have led to the greatest and least win/loss ratios. From the player's perspective, it indicates that pressing Play '400' credits 760 is currently hot, while Play '120' credits 770 is currently cold. It should be noted that this data can be generated from SAS data and does not need any customization of the existing game. Thus, it enhances the experience for the player without any retrofitting required.

Figure 19:
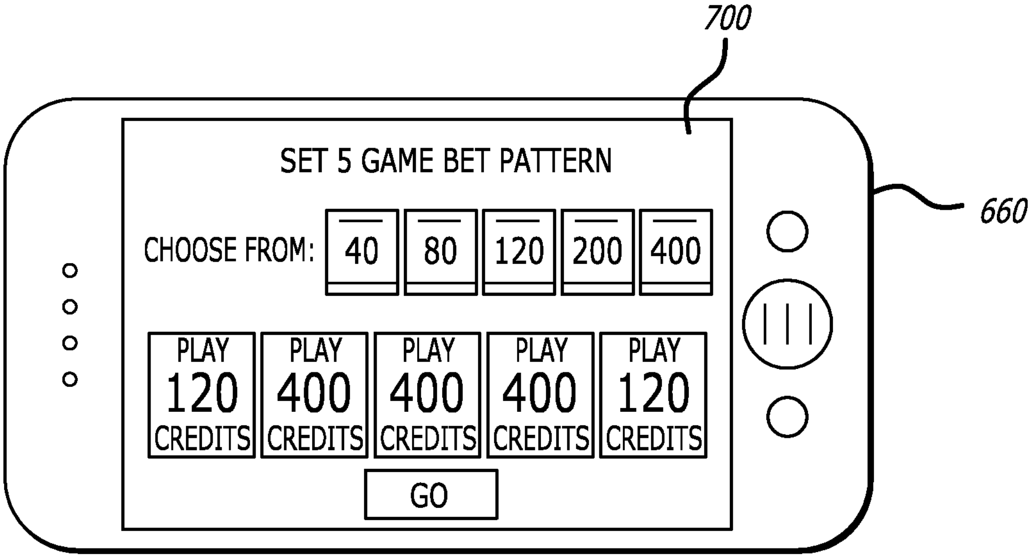
FIG. 19 illustrates a mobile phone display including a customized bet pattern.

A further enhancement to a mobile button deck 700 is shown in FIG. 19. It has been noticed that many players have superstitious betting patterns, alternating between bet amounts according to their own system. In this mode a player may set a sequence of bet amounts to play, and subsequent spins of the reels will follow this betting strategy. In this example, the player has chosen to bet 120, 400, 400, 400 and 120 in sequence. Again, no modification to the existing game is required and importantly the player need not set this configuration at the EGM. In this way, it can be done on the mobile device 660 and taken from game to game, casino to casino.

Figure 20:
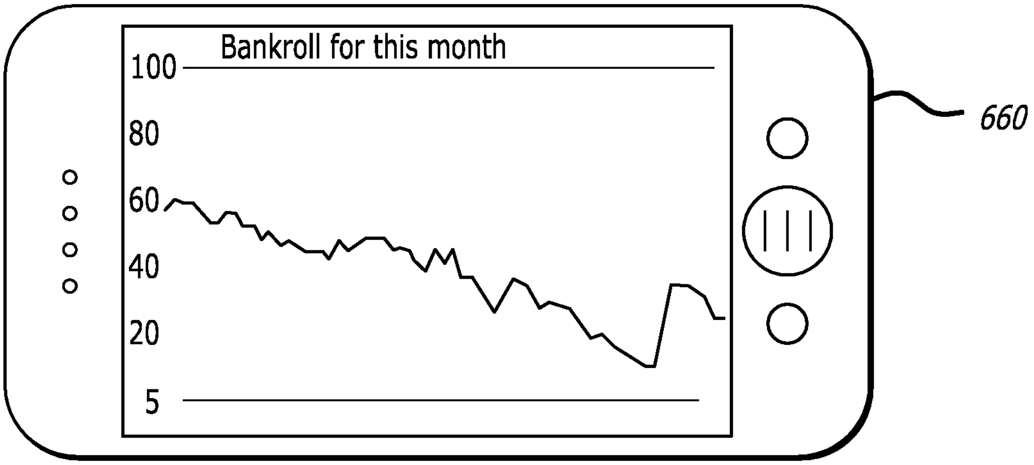
FIG. 20 illustrates an approach to harm minimization.

FIG. 20 illustrates another aspect of this disclosure. Harm minimization is a major concern of regulators, and there have been moves to present data to players to show their wins and losses over time. Along with other features of the E-wallet, such as loss and time limits, presenting this data at a mobile device 660 makes sense to the player and the regulator because it is personalized and private. Accordingly, a player can track her progress conveniently from a personal mobile phone.

Therefore, a method and system is disclosed for providing a set of easy to understand and operator transactions that a player can employ to conduct game play through a personal mobile telephone. Statistical information can be provided to the player in convenient and useful formats to enhance the use of the mobile phone for gaming purposes. In one particular approach, this disclosure leverages E-Wallet infrastructure such as a mobile wallet for casinos. In particular, systems and methods of associating a mobile device with a particular gaming machine are provided. These systems and methods are configured to be very easy for a player to operate with no training.

Those skilled in the art will readily recognize various modifications and changes that may be made to the claimed invention without following the example embodiments and applications illustrated and described herein, and without departing from the true spirit and scope of the claimed invention.

The invention claimed is:

1. A method for providing play of a game on an apparatus via a mobile device connected to the apparatus by a network, the method comprising:

transmitting from the apparatus to a stream redirector interposed between the apparatus and the mobile device, two or more streams of video and graphical data related to the game, wherein the graphical data includes playing statistics;

resealing and repositioning, by the stream director, the content of the two or more streams of video and graphical data to suit display characteristics of a single touch screen video display incorporated into the mobile device;

assembling, by the screen redirector, the two or more streams of video and graphical data into a single video stream for display on the single touch screen video display;

receiving, at the screen redirector, inputs from the mobile device related to play of the game, the inputs including coordinate data corresponding to touches at the touch screen video display; and remapping, by the screen director for use by the apparatus, the coordinate data from the mobile device to a coordinate system of the apparatus.

2. The method of claim 1, wherein the apparatus comprises a table game.

3. The method of claim 2, wherein the table game is Roulette.

4. The method of claim 1, further comprising enabling a player to set bet strategy across gaming sessions via the inputs.

5. The method of claim 1, further comprising adjusting, by the stream redirector, screen resolution and bitrate of the single video stream to match capabilities of the mobile device and the network.

6. A system for providing play of a game on an apparatus via a mobile device connected to the apparatus by a network, the system comprising:

the apparatus, configured to transmit two or more streams of video and graphical data related to the game, wherein the graphical data includes playing statistics;

the mobile device, the mobile device comprising a single touch screen video display; and a stream redirector interposed between the apparatus and the mobile device, the stream redirector configured to:

receive the two or more streams of video and graphical data;

rescale and reposition the content of the two or more streams of video and graphical data to match display characteristics of the single touch screen video display;

assemble the two or more streams of video and graphical data into a single video stream for display on the single touch screen video display;

receive inputs from the mobile device related to play of the game, the inputs including coordinate data corresponding to touches at the touch screen video display; and remap the coordinate data from the mobile device to a coordinate system of the apparatus.

7. The system of claim 6, wherein the apparatus comprises a table game.

8. The system of claim 7, wherein the table game is Roulette.

9. The system of claim 6, further comprising enabling a player to set bet strategy across gaming sessions via the inputs.

10. The system of claim 6, wherein the stream redirector adjusts screen resolution and bitrate of the single video stream to match capabilities of the mobile device and network.

* * * * *